Patented Nov. 21, 1922.

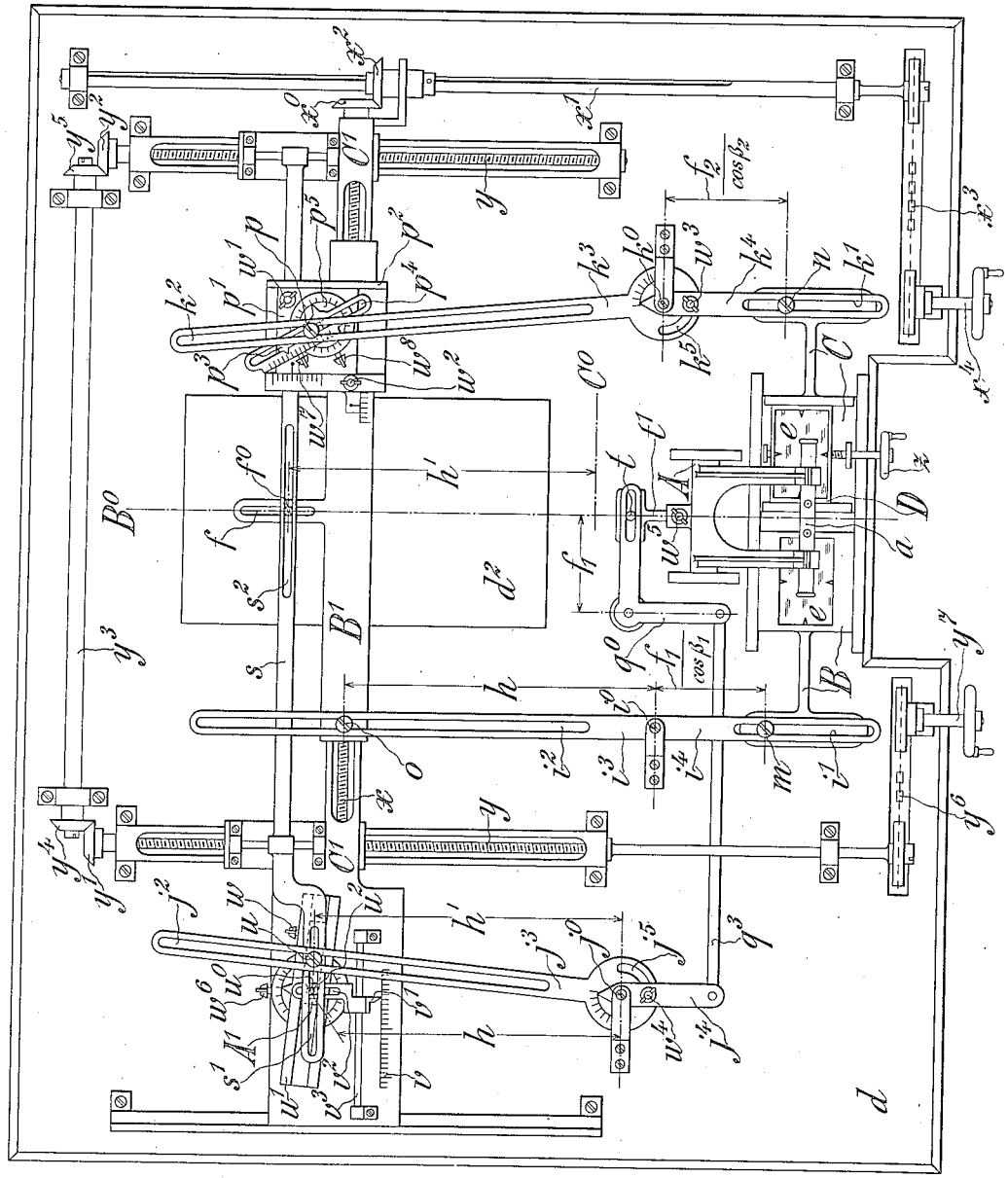

1,435,961

UNITED STATES PATENT OFFICE.

OTTO v. GRUBER, OF MUNICH, GERMANY, ASSIGNOR TO THE FIRM OF CARL ZEISS, OF JENA, GERMANY.

STEREOISOHYPSOGRAPH.

Application filed November 20, 1920. Serial No. 425,546.

*To all whom it may concern:*

Be it known that I, OTTO VON GRUBER, a citizen of the German Empire, residing at Munich, Germany, have invented a new and useful Stereoisohypsograph, of which the following is a specification.

The present invention relates to a device which permits of copying on a plane surface the surface of a spatial image to be obtained from a photostereogram, and in particular, elements of this surface designated height-lines and which device is equipped for this purpose with a comparator system comprising a binocular double microscope with two marks, yielding a stereoscopic mark-image, and a slide-system, and which is positively connected with a copying system, consisting of a spatial cross-slide system carrying the tool, in such a way that the position of the tool-point relatively to the copy-carrier corresponds at any one time to the position of that point of the object-surface, the images of which are seen in the comparator system as coinciding with its two marks.

Such devices are already known so far as utilization of a photostereogram is concerned, at the taking of which the axes of the objectives were horizontal. In these known devices the slide system of the comparator system comprises four slides. Two of the latter serve for effecting a relative displacement of the microscope and the photograms in the height-direction of the photograms, whilst the two others adjust the relative displacement of the photograms and the microscope in the breadth-direction of the photograms.

The cross-slide system contains three slides, one of which is displaceable on a fixed base-plate in the depth-direction of the copy-carrier, whilst the two others are displaceable beside each other on the said first slide in the breadth-direction of the copy-carrier. The cross-slide system is coupled to the comparator system by means of three levers.

According to the present invention the aforesaid coupling is so devised that the device also admits of copying height-lines if, on taking the photostereogram from which the height-lines are to be taken, the objective-axes were inclined to the vertical or horizontal. Besides, it is requisite to provide for a relative adjustment of the tool and the copy-carrier in the depth-direction of the copy-carrier which is independent of the motions of the cross-slide arrangement in this direction. If that of the two slides displaceable on the lowermost slide of the cross-slide arrangement, which is coupled with one of the two slides displaceable in the height-direction of the photograms, be so disposed on the slide by which it is carried that its direction of displacement is variable in a plane parallel to the breadth-direction and the depth-direction of the copy-carrier, conditions arise which are particularly favorable for the coupling.

The annexed drawing shows a constructional form in plan of a device corresponding to the present invention for copying height-lines on a drawing surface.

On a base-plate $d$ there is displaceably disposed a slide A, carrying a binocular double microscope $a$, the base-line of which is perpendicular to the direction of displacement of the slide A and which contains a mark in each of its two image-planes. The microscope $a$ serves for the stereoscopic observation of two photograms $e$, the one of which resting upon a slide B which is displaceable on the base-plate $d$ parallelly to the base-line of the microscope $a$, whilst the other one is carried by a cross-slide system which contains on the one hand a slide C which is displaceable on the base-plate $d$ along the same guide as the slide B, and which contains on the other hand a slide D which is adjustable on the slide C by means of a hand-wheel $z$ in the direction of displacement of the slide A.

The base-plate $d$ carries in addition a cross-slide system, comprising three slides $A^1$, $B^1$ and $C^1$. The slide $C^1$ is displaceably disposed on the base-plate $d$ in the direction of displacement of the slide A. The slide $B^1$ is displaceable on the slide $C^1$ in the same direction as the slides B and C on the base-plate. The slide $A^1$ is adjustable along a straight guide $u^1$ which is rotatably supported on the slide $C^1$ about an axis $u^0$ perpendicular to the directions of displacement of the slides $B^1$ and $C^1$. For fixing the slide $A^1$ on the straight guide $u^1$ and the straight guide $u^1$ on the slide $C^1$ serve the set screws $w$ and $w^6$ respectively. The scale $v$ for adjusting the slide $A^1$ is parallel to the direction of displacement of the slide $B^1$. The appertaining pointer $v^1$, guided by means of a slit $v^2$ on a stud $u^2$ of the slide $A^1$, is displaceably disposed along a shaft $v^3$, parallel to the scale $v$. The slide $B^1$ is displaceable by means of a screw-spindle $x$ which is actuated from a grooved shaft $x^1$ by a bevel wheel $x^0$ and a bevel wheel $x^2$, displaceable along the said grooved shaft $x^1$ and coupled to the slide $C^1$ by means of a driver. The shaft $x^1$ is actuated by a hand-wheel $x^4$ accessible to the right hand of the observer; the motions of this hand-wheel being transmitted to the shaft $x^1$ by a chain drive $x^3$. The slide $B^1$ carries a drawing pencil $f^0$; the appertaining drawing board $d^2$ is fastened on the base-plate $d$. The slide $C^1$ is displaced by two screw spindles $y$, the left one of which is actuated by a hand-wheel $y^7$, disposed on the left side of the observer and coupled to this spindle by means of a chain drive $y^6$, whilst the right one is actuated from the left spindle by two pairs of bevel wheels $y^1$, $y^4$ and $y^2$, $y^5$ as well as a shaft $y^3$.

For transmitting the motions of the slide A to the cross-slide system $A^1$, $B^1$, $C^1$ there serves a double lever which is rotatably supported on the base-plate $d$ about an axis $j^0$, which is parallel to the axis of rotation $u^0$ of the straight guide $u^1$ and lies with it in one and the same depth-plane. The two arms $j^3$ and $j^4$ of this double lever are adjustable relatively to each other for which purpose the arm $j^3$ is provided with an arc-guide $j^5$ along which the arm $j^4$ is movable. For fixing serves a screw $w^4$. The arm $j^3$ of the double lever acts by means of a slit $j^2$ on a stud $u$ of the slide $A^1$. The arrangement has been made in such a way that, on the stud $u$ coinciding with the axis of rotation $u^0$ of the straight guide $u^1$, the slide $A^1$ occupies its zero-position in which the value zero is indicated on the scale $v$ by the pointer $v^1$. The arm $j^4$ is jointedly connected by a rod $q^3$ with a cranked lever $q^0$ which is rotatably supported on the base-plate $d$ and both arms of which embrace a right angle. The axis of rotation of this cranked lever lies with the axis of rotation $j^0$ of the double lever $j^3$, $j^4$ in a plane which stands perpendicularly to the direction of displacement of the slide $C^1$. Besides, the arm of the cranked lever acting from the rod $q^3$ is parallel to the lever-arm $j^4$. The other arm of the cranked lever acts by means of a slit on a stud $t$ disposed on an intermediate part $t^1$. The latter serves for adjusting purposes and is so disposed on the slide A as to be adjustable relatively to this slide A in its direction of displacement. The fixing is effected by a set screw $w^5$.

The slide B is coupled to the cross-slide system $A^1$, $B^1$, $C^1$ by means of a double lever $i^3$, $i^4$ rotatably supported on the base-plate $d$ about an axis $i^0$. The arm $i^4$ of the double lever acts by means of a slit $i^1$ on a stud $m$ of the slide B which is assumed to be adjustable on this slide in the direction of displacement of the slide A. The other arm $i^3$ of the double lever acts by means of a slit $i^2$ on a stud $o$ which is so disposed on the slide $B^1$ that the component ($h$) of its distance from the axis of rotation $i^0$ is equal to the distance apart of the axes of rotation $j^0$ and $u^0$.

The coupling of the slide C with the cross-slide system $A^1$, $B^1$, $C^1$ is effected by a double lever $k^3$, $k^4$, rotatably supported on the base-plate $d$ about an axis $k^0$ which lies with the axis of rotation $i^0$ in a plane parallel to the direction of displacement of the slide B. The two arms $k^3$ and $k^4$ of the double lever $k^3$, $k^4$, are adjustable relatively to each other, for which purpose the arm $k^3$ is provided with an arc-guide $k^5$ along which the arm $k^4$ is movable. The fixing is effected by means of a screw $w^3$. The arm $k^4$ acts by means of a slit $k^1$ on a stud $n$ of the slide C which is assumed to be adjustable on this slide in the direction of displacement of the slide A. The other arm $k^3$ acts by means of a slit $k^2$ on a stud $p$. The latter belongs to a slide $p^3$ which is adjustable along a slot $p^4$ of a rotatable slide $p^5$, which latter is disposed on the upper slide $p^1$ of a cross-slide system $p^1$, $p^2$, adjustable in the direction of displacement of the slide $C^1$. For fixing the slide $p^3$ on the rotatable slide $p^5$ and for fixing the latter on the slide $p^1$ serve the set screws $w^7$ and $w^8$ respectively. The lower slide $p^2$ of that cross-slide system $p^1$, $p^2$ is adjustable on the slide $B^1$ in the direction of displacement of this latter slide. For fixing the slide $p^1$ on the slide $p^2$ and for fixing the latter on the slide $B^1$ serve two set screws $w^1$ and $w^2$ respectively. The arrangement of the slides $p^1$, $p^2$, $p^3$ and $p^5$ has been made in such a way that in the zero-position of $p^3$ the stud $p$ coincides with the axis of rotation of the rotatable slide $p^5$, and that furthermore in the simultaneous zero-position of the slides $p^1$ and $p^3$, the components of the distances of the stud $p$ from the axis of rotation $k^0$ and of the stud $o$ from the axis of rotation $i^0$, falling into the depth-direction, have the same value ($h$), and that finally, in the simultaneous zero-position of the slides $p^1$, $p^2$ and $p^3$, the lever-arms $i^3$ and $k^3$ are parallel to one another.

On the slide $C^1$ there is disposed a slide $s$ which is capable of undergoing a displacement in the direction of displacement of the slide $C^1$, independently of the motions of this slide $C^1$. The slide $s$ contains two slits $s^1$ and $s^2$, parallel to the direction of displacement of the slide $B^1$. In the slit $s^1$ engages the stud $u$ of the slide $A^1$, whilst in the slit $s^2$ there engages the drawing pencil $f^0$ which is displaceably disposed on the slide $B^1$ along a slit $f$ parallel to the direction of displacement of the slide $C^1$. The appertaining drawing board $d^2$ is fixed on the base-plate $d$.

In order to be able to trace a height-line representing the ground plan projection of a height-layer, the height of which above the left-hand objective has the value Y, the device must be adjusted as follows. The components of the distances of the stud $m$ from the axis of rotation $i^0$ and of the stud $n$ from the axis of rotation $k^0$, lying in the direction of displacement of the slide A, have the value $\frac{f_1}{\cos \beta_1}$ and $\frac{f_2}{\cos \beta_2}$ respectively. The component of the distance of the stud $t$ from the axis of rotation of the cranked lever $q^0$, lying in the direction of displacement of the slide B, has the value $f^1$. The arms $j^3$ and $j^4$ of the double lever $j^3$, $j^4$ are adjusted relatively to each other in such a way as to embrace the angle $180-\beta$, reckoned clockwise from the arm $j^3$, and the arms $k^3$ and $k^4$ of the double lever $k^3$, $k^4$ in such a way, as to embrace the angle $180 + \gamma$, reckoned clockwise from the arm $k^3$. The straight guide $u^1$ of the slide $A^1$ is inclined to the direction of displacement of the slide $B^1$ by the angle $\beta_1$ and the slide $A^1$ is so displaced out of its zero-position that the value Y, measured by the copying scale, is indicated on the scale $v$ by the pointer $v^1$. In that case the component ($h'$) of the distance of the stud $u$ from the axis of rotation $j^0$, lying in the direction of displacement of the slide $C^1$, has the value Z, measured by the copying scale, and the corresponding component of the distance of the stud $u$ from the axis of rotation $u^0$ has the value Y tan $\beta_1$, measured by the copying scale. Owing to its coupling with the slide $A^1$ the drawing pencil $f^0$ has also in that case a distance from the zero depth-plane $C^0$ of the value Z, measured by the copying scale, whilst its distance from the zero breadth-plane $B^0$ has the value X, measured by the copying scale. For the slides $p^1$, $p^2$ and $p^3$ the values, measured by the copying scale, and by which these slides are displaced out of their zero-positions, are as follows:

For $p^1$ : $b$ (sin $\alpha$ cos $\varepsilon$ — tan $\beta_2$ cos $\gamma$ sin $\varepsilon$)
For $p^2$ : $b$ (cos $\alpha$ cos $\varepsilon$ — tan $\beta_2$ sin $\gamma$ sin $\varepsilon$)
For $p^3$: $Y \sqrt{\tan^2 \beta_1 + y^2 \beta_2 - 2 \tan \beta_1 y \beta_2 \cos \gamma}$ In that case the rotatable slide $p^5$ has such a position that the direction of displacement of the slide $p^3$ is inclined to the direction of displacement of the slide $B^1$ by an angle $\delta$, $\delta$ being determined by the equation—

$$\tan \delta = \frac{\tan \beta_2 \cos \gamma - \tan \beta_1}{\tan \beta_2 \sin \gamma}.$$

The marks of the double microscope $a$ are adjusted for the images of an object-point with the co-ordinates X, Y and Z.

In that case the following lettering has been adopted:

$b$ : connecting line of the objectives (base line).
$f_1$ : focal length of the left-hand objective.
$f_2$ : focal length of the right-hand objective.
$\alpha$ : angle of inclination of the horizontal projection of the left-hand objective axis relatively to that perpendicular to the base line which lies in the horizontal plane.
$\beta_1$ : angle of inclination of the left-hand objective axis relatively to the horizontal plane.
$\beta_2$ : angle of inclination of the right-hand objective axis relatively to the horizontal plane.
$\gamma$ : angle of inclination of the horizontal projections of the two objective axes relatively to one another.
$\varepsilon$ : angle of inclination of the base line relatively to the horizontal plane.
X : distance of the object-point focussed from the vertical plane containing the axis of the left-hand objective.
Y : distance of the object-point focussed from the horizontal plane containing the left-hand objective.
Z : distance of the object-point focussed from the plane containing the left-hand objective and standing perpendicularly on the horizontal projection of the axis of the left-hand objective.

In order to use the device the observer looking into the double microscope $a$ must actuate the hand wheels $x^4$, $y^7$ and $z$ in such a way that the stereoscopic mark-image is guided along the stereoscopic object-image. In that case the drawing pencil $f^0$ traces on the drawing board $d^2$ the height-line corresponding to the height Y indicated on the scale $v$.

I claim:

1. In a device for copying from a stereoscopic pair of photograms of an object of three dimensions onto a plane surface the combination of a stereo-comparator comprising four interdependent slides, A, B, C and D, a copying system containing a copy carrier and a drawing device comprising a tool and three interdependent slides, $A^1$, $B^1$ and $C^1$ for moving the said tool, the slides $A^1$ and $B^1$ being carried by slide $C^1$ adjacent to each other, the direction of displacement of slides $A^1$, $B^1$ and $C^1$ respectively lying in one and the same plane, means comprising three levers for positively coupling the slides A, B and C with those of the said drawing device, by one of which levers the slide C is coupled to the drawing device, this lever having two arms adjustable relatively to one another in its plane of rotation, a two-member slide system the lower member of which is displaceable on the slide $B^1$ and the upper member of which carries a straight guide rotatable about an axis perpendicular to the directions of displacement of the said two members, and means for coupling this straight guide and the said lever, while by the other two levers the slides A and B are coupled to the drawing device, the tool and the copy-carrier being adjustable relatively to each other in the direction of displacement of the slide C¹ independently of the movements of that slide which carries the tool, and a system of actuating devices controlling the said stereo-comparator and the said drawing device, the said system being accessible to the operator while he is looking into the stereo-comparator.

2. In a device for copying from a stereoscopic pair of photograms of an object of three dimensions onto a plane surface the combination of a stereo-comparator comprising four interdependent slides, A, B, C and D, a copying system containing a copy-carrier and a drawing device comprising a tool and three interdependent slides A¹, B¹ and C¹ for moving the said tool, the slides A¹ and B¹ being carried by slide C¹ adjacent to each other, the direction of displacement of slides A¹, B¹ and C¹ respectively lying in one and the same plane, means comprising three levers for positively coupling the slides A, B and C with those of the said drawing device, by one of which levers the slide C is coupled to the drawing device, this lever having two arms adjustable relatively to one another in its plane of rotation, a two-member slide system the lower member of which is displaceable on the slide B¹ and the upper member of which carries a straight guide rotatable about an axis perpendicular to the directions of displacement of the said two members, and means for coupling this straight guide and the said lever, while by the second and the third lever the slides A and B respectively are coupled to the drawing device, the second lever having its arms adjustable relatively to one another in its plane of rotation, a straight guide being so disposed on the slide C¹ as to be rotatable about an axis perpendicular to the plane of rotation of this lever, the slide A¹ being displaceable along this guide, means for indicating the projection of the displacements of the slide A¹ into the direction of displacement of the slide B¹, the tool and the copy-carrier being adjustable relatively to each other in the direction of displacement of the slide C¹ independently of the movements of that slide which carries the tool, and a system of actuating devices controlling the said stereo-comparator and the said drawing device, the said system being accessible to the operator while he is looking into the stereo-comparator.

3. In a device for copying from a stereoscopic pair of photograms of an object of three dimensions onto a plane surface the combination of a stereo-comparator comprising four independent slides, A, B, C and D, a copying system containing a copy-carrier and a drawing device comprising a tool and three interdependent slides A¹, B¹ and C¹ for moving the said tool, the slides A¹ and B¹ being carried by slide C¹ adjacent to each other, the direction of displacement of slides A¹, B¹ and C¹ respectively lying in one and the same plane, means comprising three levers for positively coupling the slides A, B and C with those of the said drawing device, by one of which levers the slide C is coupled to the drawing device, this lever having two arms adjustable relatively to one another in its plane of rotation, a two member slide system the lower member of which is displaceable on the slide B¹ and the upper member of which carries a straight guide rotatable about an axis perpendicular to the directions of displacement of the said two members, and means for coupling this straight guide and the said lever, while by the other two levers the slides A and B are coupled to the drawing device, means for coupling the tool and the slide A¹ so as to impart to the tool a movement in the direction of displacement of the slide C¹ equal to the movements of the slide A¹ relatively to the slide C¹ in the direction of displacement of this slide, and a system of actuating devices controlling the said stereo-comparator and the said drawing device, the said system being accessible to the operator while he is looking into the stereo-comparator.

DR. OTTO v. GRUBER.

Witnesses:
PAUL KRÜGER,
FRITZ SANDER.